US012674762B2

(12) United States Patent
Deppieri et al.

(10) Patent No.: US 12,674,762 B2
(45) Date of Patent: Jul. 7, 2026

(54) MODULAR APPARATUS FOR THE INSPECTION OF INDUSTRIAL PRODUCTS AND RELATED METHODS

(71) Applicant: MICROTEC S.p.A., Bressanone (BZ) (IT)

(72) Inventors: Francesco Deppieri, Mira (VE) (IT); Ruggero Frezza, Padua (IT)

(73) Assignee: MICROTEC S.p.A., Bressanone (IT)

( * ) Notice: Subject to any disclaimer, the term of this patent is extended or adjusted under 35 U.S.C. 154(b) by 219 days.

(21) Appl. No.: 18/573,337

(22) PCT Filed: Jun. 20, 2022

(86) PCT No.: PCT/IB2022/055722
§ 371 (c)(1),
(2) Date: Dec. 21, 2023

(87) PCT Pub. No.: WO2022/269470
PCT Pub. Date: Dec. 29, 2022

(65) Prior Publication Data
US 2024/0288377 A1 Aug. 29, 2024

(30) Foreign Application Priority Data
Jun. 21, 2021 (IT) ........................ 102021000016229

(51) Int. Cl.
*G01N 21/88* (2006.01)
*G06F 30/20* (2020.01)
*G06F 111/18* (2020.01)

(52) U.S. Cl.
CPC ..... *G01N 21/8851* (2013.01); *G01N 21/8806* (2013.01); *G06F 30/20* (2020.01); *G01N 2021/8887* (2013.01); *G06F 2111/18* (2020.01)

(58) Field of Classification Search
USPC .......................................................... 382/141
See application file for complete search history.

(56) References Cited

PUBLICATIONS

Fujii et al: "Development of optical simulation tool for defect inspection", Proceedings of SPIE , PO Box 10 Bellingham WA 98227-0010 USA, vol. 7272, Mar. 23, 2009 (Mar. 23, 2009), pp. 1-9, XP040495725, San Jose , California, USA p. 1, line 20—p. 4, line 14 (Year: 2009).*

(Continued)

*Primary Examiner* — Jacky X Zheng
(74) *Attorney, Agent, or Firm* — Foster Garvey PC

(57) ABSTRACT

Inspection of industrial products entails the "Model Based Design" paradigm with an apparatus associated with a digital clone of the real acquisition system. The digital clone reproduces in a virtual environment the features of said system and of the product affected by anomalies to be inspected.

By generating virtual images of the product through simulations on said digital clone and processing virtual images through a vision system including a novel data fusion module, it is possible to define the optimal architecture and parameterization of the real acquisition system that maximize the likelihood of identifying anomalies in products even in conditions that are difficult or expensive to replicate in the real world.

This reduces time in designing and set-up as well as costs of an inspection apparatus. Furthermore it enables to reconfigure the apparatus to products and/or anomalies other than those for which it was initially designed.

13 Claims, 6 Drawing Sheets

(1)

(56)              References Cited

PUBLICATIONS

Fujii, et al., "Development of optical simulation tool for defect inspection", Proceedings of SPIE, Bellingham, Washington, vol. 7272, Mar. 23, 2009, XP040495725.

* cited by examiner

(6)

(SE)        (RE)

(503)   (504)   (501)   (DT)   (604)   (603)   (600,601,602)

(512,513)
(SCEN)

(505)      (605)

(603,604)

(6)       (611)

(10,11)

(601)

(7)

(10,11)

MODULAR APPARATUS FOR THE INSPECTION OF INDUSTRIAL PRODUCTS AND RELATED METHODS

RELATED APPLICATIONS

This application is a national stage under 35 U.S.C. § 371 of International Application No. PCT/IB2022/055722, filed Jun. 10, 2022, which claims the benefit of priority of Italy Patent Application No. 102021000016229, filed Jun. 21, 2021.

TECHNICAL FIELD

The present disclosure relates to a modular apparatus for the inspection of industrial products as well as related methods based on vision and simulation technologies according to the "Model Based Design" paradigm.

BACKGROUND INFORMATION

In the growing global competition, modern production systems are requested, on the one hand, to provide safe and quality products, and on the other, to reduce time-to-market as much as possible. In particular, this challenge forces the abatement of the development cycle which typically includes the following stages: the starting point is designing an initial prototype of the product; prototype testing in the various conditions of use is performed; prototype is then improved by including modifications emerged from testing; eventually, the final product having the required quality level is released.

Within the product development cycle, inspection systems of the product/prototype play a fundamental role as they measure the level of acceptable quality and they determine the conditions of the industrial process which enable product manufacturing while maintaining a pre-defined level of quality over time.

In the majority of industrial products, such as parts of a vehicle or eyewear, the inspection process requires artificial vision systems that by means of appropriate cameras and optical systems acquire images of the piece which are useful to identify defects, manufacturing process drift, or more generally, to check whether the piece meets specifications or not.

Despite the enormous technological enhancements that imaging devices, such as cameras, have achieved in recent years, current computer vision systems have a number of limitations and drawbacks.

The main limitation depends in that each product to be inspected has peculiar and unique characteristics which generally make technically difficult to reconfigure or modify an inspection system. In other words known inspection systems are rigid. Rigidity of traditional inspection apparatuses and methods concerns both the hardware component (each automatic visual inspection system requires a dedicated design of the acquisition system), and the software component (the processing procedures of the acquired images are very application-specific).

In any case, when technically feasible, such modifications involve high costs for readjusting the inspection system and for training specialized personnel for the new application.

Besides the challenge of reconfigure to new and unpredictable needs, other problems that typically affect any industrial inspection system are: high costs of installation, configuration and calibration; installations are often well under the potential of the system (one reason is that suppliers are not aware of the installation parameters); finally, data provided by the acquisition system are not optimal with respect to the objective of the inspection system.

These issues directly or indirectly affect generation and interpretation of images acquired by the acquisition system. Regardless of what the specific purposes of the inspection may be, the availability of "quality data", i.e., data representing the phenomena under examination, is a key element for any successful inspection process.

In summary, the extreme difficulty of industrializing a vision system, combined with the need to use physical prototypes in the development cycle of a new product, constitutes a challenging technical problem.

In conclusion, according to the best knowledge of the present inventors, it is not adequately addressed the problem of developing a modular inspection system which is simple to reconfigure according to the needs of the inspection process and at the same time present high defect detection sensitivity.

SUMMARY OF THE DISCLOSURE

Object/Scope of the Disclosure

In view of the above, the present disclosure intends to overcome the existing disadvantages and drawbacks of the prior art by providing an apparatus for the inspection of industrial products and related methods having novel and inventive characteristics.

Accordingly, the first and main object of the present disclosure is to provide an apparatus for the inspection of industrial products having modular characteristics. This purpose includes providing an apparatus with reduced set-up times, whose components can be easily modified or reconfigured to allow adjustment of the apparatus to different inspection conditions, or to inspection of different industrial products.

A second important object of the present disclosure is to provide a method for the inspection of industrial products having high flexibility, i.e., that can be applied to various products differing in shape, material, surface morphology and that is also capable of identifying different types of defects affecting the same product such as scratches or embossing.

Particularly, a third important object of the present disclosure is disclosing a method for the inspection of industrial products based on innovative simulation techniques. This purpose includes: predicting the behavior of the apparatus in unconventional use conditions of the product or in conditions that in the real world may occur with such a low frequency that a study is not justified; training the inspection apparatus to recognize specific anomalies in pre-defined conditions without necessarily having real images of the product under inspection which could be very expensive to obtain.

In addition, a fourth important object of the present disclosure is to provide an apparatus and an inspection method which is able to identify anomalies and defects potentially affecting industrial products in the optimal acquisition conditions so that artifacts minimization, apparatus set-up time reduction, high inspection speed and high sensitivity can be achieved.

This object includes estimation in advance of the detection rate obtainable without having first physically build the inspection system.

Finally, a last object of the present disclosure is to provide an apparatus for the inspection of industrial products and the related inspection procedure, in a simple way and by means of known technologies.

Additional objects and advantages of the disclosure will be set forth in part in the detailed description which follows and in part will be obvious from the description or may be learned by practice of the disclosed embodiments.

Technical Solution

These and still other purposes, which will appear more clearly in the specification which follows, are achieved by a modular inspection apparatus, a method for product inspection, and a computer program comprising instructions which, when the program is executed by a computer, cause the computer to carry out said method.

The invention is defined in the appended independent claims 1, 8 and 12 while advantageous features are set forth in the appended dependent claims. The aforesaid claims, to which reference should be made, are hereinafter specifically defined and are intended as an integral part of the present description.

In summary, the inventive concept underlying the present disclosure consists in the generation of a "digital clone" (or "digital twin") of the real inspection apparatus which operates in a virtual environment reproducing the real environment where the inspection process takes place. Each real component of the inspection apparatus and the environment has its own virtual correspondent. Therefore, the digital clone includes: a 3d model of the object to be inspected, a model of the defects or anomalies that potentially affect the object; a model of the camera and lights; a model of the backgrounds in the real environment.

By operating simulation processes in which parameters defining said models (e.g., the number and type of cameras and illuminators; their positioning and orientation) are varied within predefined sets of values, it is possible to define the characteristics and optimal use conditions of the real acquisition apparatus i.e., it is possible to maximize the likelihood of identifying specific anomalies or defects in the object according to the objective of the inspection process.

The simulation processes are implemented on an appropriate simulation engine which is associated with the inspection apparatus but is not necessarily part of it.

Therefore, the real inspection apparatus is designed and defined according to the outcomes provided by the simulation processes implemented by the simulation engine.

For the sake of clarity, it should be noted that in this specification, the set defined by all values of the parameters shall be defined with the term "parameter space", while the features and optimal use conditions of the real acquisition apparatus shall be referred also as "parameterization". The physical components of the acquisition system and their virtual correspondents or clones are arranged in the real or virtual environment according to an architecture defined by parameters such as the type of camera or Cartesian coordinates.

For the sake of convenience, the parameterization of the acquisition system shall be defined by a distinct set with respect to the one defining the architecture. However, they can be combined into a single set.

In summary, the inventive concept underlying the present disclosure takes the form of an inspection apparatus and an inspection method and it is implemented in two distinct, yet mutually integrated, modes. In the first, or "design mode", the simulator emulates a virtual acquisition system, to define the optimal structure of the real acquisition apparatus and the parameterization that enables images acquisition of the real object in the best possible conditions.

In the second, or "real analysis mode", the outcomes generated by the simulator are used to define and configure components of the real inspection apparatus to enable inspection of real objects in the best possible working conditions.

Particularly, in the design mode it is possible, first, to model a given defect or anomaly, and then, to apply the defect model to the ideal model of the object in a controlled manner. Preferably, the defect model takes the form of a covering element or texture applied to the surface of the object.

In this regard, for the sake of clarity the term "texture" referring to anomalies or defects shall mean a superimposition of a set of three-dimensional or two-dimensional anomalies to the three-dimensional or two-dimensional surface of the model of the ideal object. Particularly, this definition includes a simple "flat texture" of defects or anomalies. This set can be distributed evenly or unevenly on the surface of the ideal object.

In both working modes, a novel and specific data fusion module plays a central role. Said module actually allows interaction between the real object and its digital clone, as will be explained in detail below.

It shall be evident to those skilled in the art as this approach is totally different from the ones applied to known vision systems even those inspired by the Model Based Design paradigm. As a matter of fact, in Model Based Design vision systems, the use of a "digital twin" only concerns individual components of the inspection system and an interaction between real and virtual inspection systems does not occur.

The disclosure outlined herein has a number of advantages mainly: the modularity of the inspection system which can be advantageously readjusted to different products and/or control processes/conditions; high defect selectivity/sensitivity and identification even in conditions that in the real world occur very rarely and therefore are difficult and expensive to reproduce; estimation in advance of the achievable detection rate without having first physically build the inspection system.

BRIEF DESCRIPTION OF THE DRAWINGS

The present disclosure will be more fully understood by reference to the following drawings which are provided solely for illustration of the embodiments and not limitation thereof.

These figures illustrate and demonstrate various features and embodiments of the present disclosure but are not to be construed as limiting the disclosure.

Further characteristics and advantages of the disclosure will become apparent from the description of three pre- ferred, but not exclusive, embodiments which follow.

DETAILED DESCRIPTION OF EMBODIMENTS

With reference to the aforementioned figures, a first object of the present disclosure is an inspection apparatus (1) of objects having general characteristics defined in the enclosed claim 1, omitted here for the sake of brevity, but which is intended as an integral part of this specification. The inspection apparatus (1) herein disclosed is intended to check for anomalies or defects in an arbitrary object in association with an inspection procedure.

Therefore, a second object of the present disclosure is also a method for the inspection of a real physical object (601) potentially affected by real anomalies or defects (602). Said method has general characteristics defined in the enclosed claim 8, omitted here for the sake of brevity, but which is intended integral part of this specification.

Finally, a third object of the present disclosure is a computer program comprising instructions which, when the program is executed by a computer, cause the computer to carry out the inspection method. whose general character- istics are defined in claim 12, omitted here for the sake of brevity, but which is intended as an integral part of this specification.

The units and components of the inspection apparatus (1) and the role they play in the inspection procedure according to the disclosure are described below.

The Real Acquisition System

Figure 1:
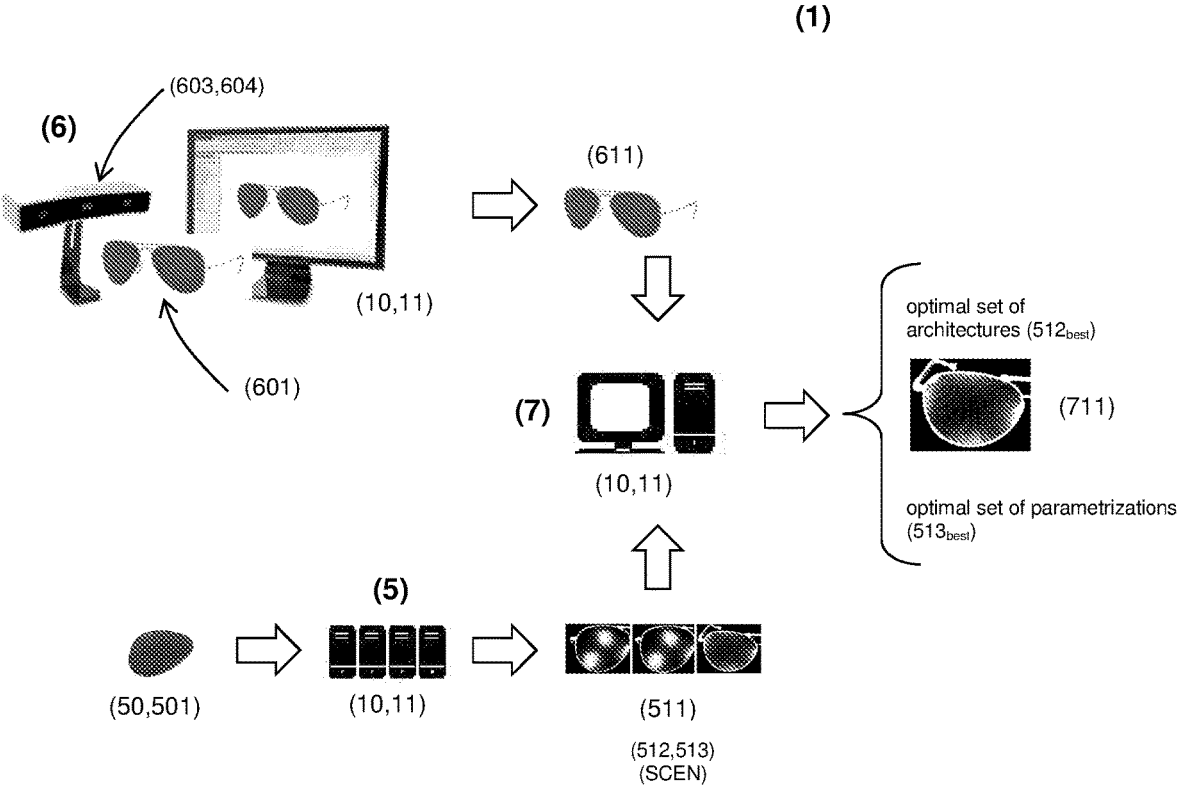
FIG. 1 schematically illustrates the structure of the inspection apparatus according to the disclosure.
Figure 2:
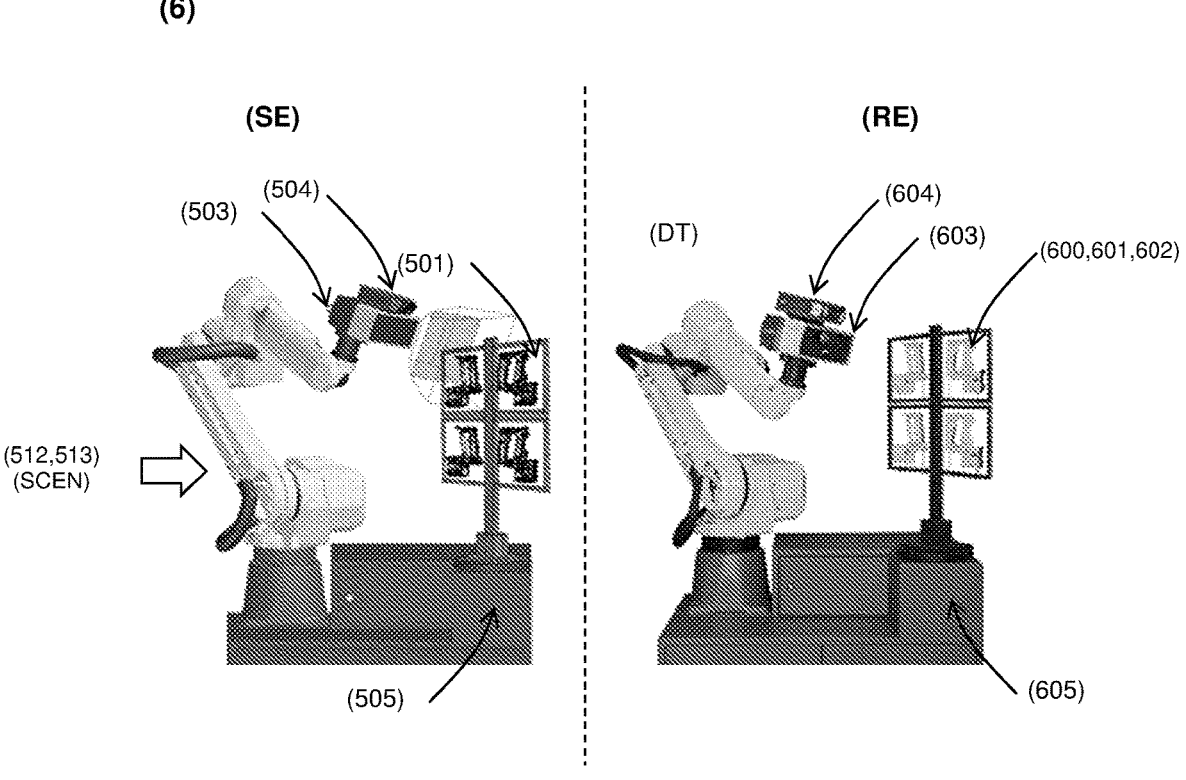
FIG. 2 schematically illustrates the structure of the real acquisition system and the processes in which it is involved with the related input and output data.
Figure 2:
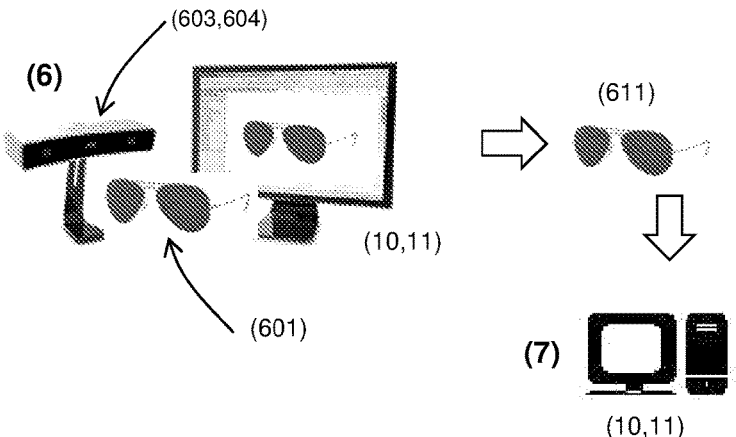

With reference to the accompanying FIGS. 1 and 2, the inspection apparatus (1) according to the disclosure includes a real acquisition system (6). This apparatus (1), substan- tially of a known type, is placed in a real environment (RE) and includes the following components: one or more illu- minators (604) for generating and directing radiation towards a real physical object (601) which may have anoma- lies or defects; one or more cameras (603) for acquiring real images (611) of said object (601) by means of said radiation; one or more background elements (605) of the real envi- ronment (RE) which interact with said radiation and hence bias the acquisition process of said real images (611).

Any processing on the images (611) is performed by a processing unit (10) functionally associated with the real acquisition system (6) which will be described below.

The inspection apparatus (1) according to the disclosure is characterized in that it is associated with a digital clone (DT) of the real acquisition system (6). As will be explained in detail below, the components features of the real acquisition system (6), as well as the best way to use them according to the objective of the inspection process, are defined by simulations performed by the simulation engine (5). In other words, cameras (603), illuminators (604), background ele- ments (605) are selected, positioned and oriented according to the optimal architecture generated by the simulation engine (5). Furthermore, the optimal use conditions of the cameras (603) and the illuminators (604), i.e., those that maximize the objective function of the inspection process, are defined by parameterizations (503) which, as we shall see, are generated by the simulation engine (5).

Preferably the camera (603) produces an optical image of the real physical object (601) subjected to inspection as a result of the interaction between the electromagnetic radiation emitted by the illuminators (604) and the reflecting surface of said object (601). However, it is apparent that the camera (603) and the illuminators (604) can be replaced by any device capable of generating and analyzing a signal which is related to a defect potentially affecting that object (601). For example, the camera (603) and the illuminators (604) could be, respectively, a detector and an emitter of acoustic waves, e.g., ultrasounds, or electrons.

In summary, the real acquisition system (6) receives an input consisting the real object (601) to be inspected and produces as an output a set or stream of real images (611) of the object (601). In turn, each image (611) of this set is associated with the specific camera that generated the image itself, as well as with the real acquisition conditions (613).

In one embodiment provided by way of explanation of the disclosure, and not meant as a limitation thereof, the object (601) of which the camera (603) acquires images (611) can be of two types depending on whether or not it is affected by anomalies (602).

In still one embodiment, an ideal physical object (600) is subjected to inspection, i.e., an object free of any anomaly or defect (602): it represents the "golden sample" or the best possible sample of the real object (601). This ideal physical object (600) can be used to create reference images (611) for different purposes, for example for comparison purposes against a standard.

In a further embodiment of the present disclosure, which represents the normal operating condition for the apparatus (1) according to the disclosure, a physical object (601) potentially affected by real anomalies (602) is subjected to inspection. Such anomalies, as we shall see later, are iden- tified and classified by the vision system (7) through real images (611) acquired by the real acquisition system (6).

The Simulation Engine

The inspection apparatus (1) according to the disclosure is characterized in that it is associated with a digital clone (DT) of the real acquisition system (6) described above. The digital clone (DT) is generated by a simulation engine (5) which generates the digital clone (DT) of the inspection apparatus (1) in a simulated environment (SE), dual of the real environment (RE).

Figure 3:
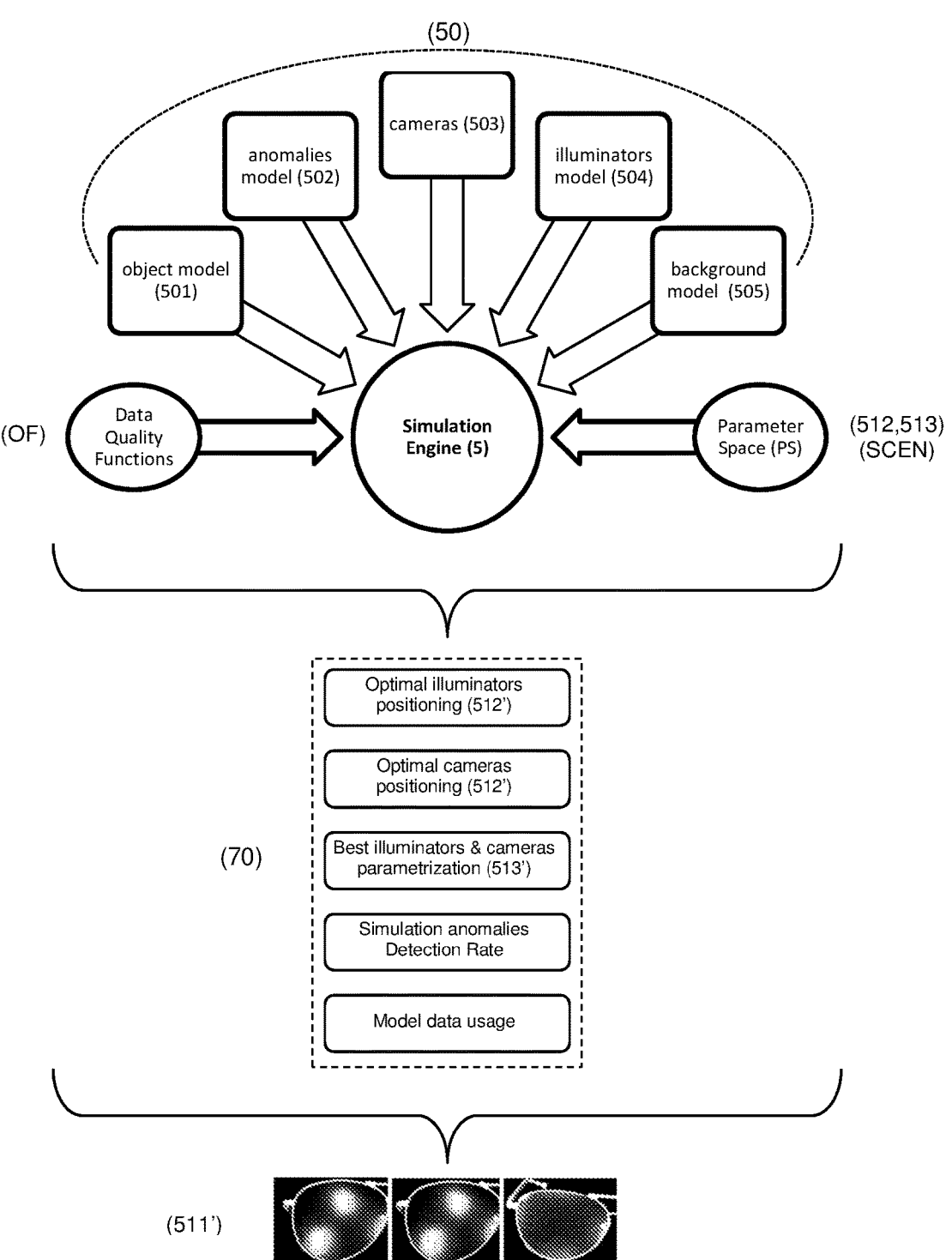
FIG. 3 schematically illustrates the structure of the simulation engine and the processes in which it is involved with the related input and output data.

For this purpose, the input of the simulation engine are the following models (50) as the enclosed FIGS. 1 and 3 illustrate by way of explanation of the disclosure, and not meant as a limitation thereof: the model of the ideal object (501); the model of the defects or anomalies (502); the model of the acquisition system (503); the model of the illuminators (504); the model of the background and the real environment (505).

The simulation engine (5) is associated with a computer program implemented in a processing unit (10) functionally associated with the simulator (5) whose characteristics and functions shall be described below.

In one embodiment provided by way of explanation of the disclosure, and not meant as a limitation thereof, the simu- lation engine (5) is UnReal® (registered trademark of Epic Games Inc) an application that allows the integration of customized models thanks to an effective SDK environment.

The characteristics of these models are provided below and are intended solely for illustration of the disclosure and not a limitation thereof.

The model of the ideal object (501) describes in the simulated 3d environment (SE) any ideal physical object (600) subjected to inspection, for example as a part of a quality control process. By definition, the model of the ideal object (501) is not affected by defects since it represents the digital clone of the ideal physical object (600), i.e., the best possible sample of the object (the "golden sample") to be inspected according to the acceptable quality level described by the objective function (OF). This model (501) is described with the relative tolerances by a 3d model in a software format that can be imported by the simulation engine (6). For example, useful formats are "stl", "dwg", "obj", or other well-known formats.

Furthermore, the model of the ideal object (501) describes not only the dimensions of the real physical object (601), but also any other features that could influence the acquisition process or the inspection objective, such as e.g., the material of the real physical object (601) or the morphology of its surface. In fact, the description of the object through its model represents the main input of the system and drives the construction of the overall system that will be designed around.

The simulated environment (SE) generated by the simulation engine (6) according to the disclosure includes a model of the defects or anomalies (502), which could affect the real physical object (601) and motivate the use of a control process by means of the inspection system (1) according to the present disclosure. For each real anomaly (602) it is necessary to create a 3d model (502) that describes the deviations from the model of the ideal object (600) in any format such as "stl", "dwg", "obj", or other native formats allowed by the simulation engine (6).

In one embodiment provided by way of explanation of the disclosure, and not meant as a limitation thereof, an anomaly (602) such as a scratch could be simulated with a model (502) of a "groove" placed on the surface of the object (501).

In one embodiment of the present disclosure, it is possible to consider a single model of the object (501') which already contains information of the anomalies. This operating mode is useful when it is easy to obtain samples of the real version of the object (601) and conversely there are not available the two distinct models, one for the ideal physical object (600) and the other for anomalies (502) to be detected.

In a further embodiment provided by way of explanation of the disclosure, and not meant as a limitation thereof, the anomaly (502) can be introduced in the model of the object (501) in the form of a texture or a set of covering or texture elements (506) that covers the entire surface of the object model (501) and whose function shall be explained below. The texture is created using a specific anomaly model (502) with the aim of creating a defective simulated object (501') and enabling identification and classification of the anomaly in the object (502.602).

The simulated environment (SE) generated by the simulation engine (6) according to the disclosure also includes a model of the acquisition system (503), for example the model of a camera, which is used by the simulation engine (5) to create the set of images (511) that simulate the object (601) in the digital virtual environment (SE). For this purpose, in this model (503) every features of the real acquisition system (6) must be described with the variability domain of the corresponding parameter.

In one embodiment provided by way of explanation of the disclosure, and not meant as a limitation thereof, the characteristics/parameters include for each camera (503,603), or other image acquisition device: the position and direction of acquisition with respect to the pre-defined reference system; the type of camera and therefore the format, the size of the image and the resolution in dpi; the frame rate, i.e., the number of complete frames acquired and stored in a memory unit per second; the gain of the camera; the exposure time; the camera transfer function including optics (Modulation Transfer Function, MTF); the focal length; focus; the field of view (FOV) of the camera in terms of physical size.

The simulated environment (SE) generated by the simulation engine (6) according to the disclosure includes a model of the illuminators (504). It describes in the 3d simulated environment the real illuminators (604) used by the inspection apparatus (1) according to the objective of the inspection, the characteristics of the object (601) and the defect (602) to be inspected. Several models of illuminators, sometimes very sophisticated, are available directly in commercial simulation engines such as UnReal® ("Lighting the Environment-Unreal Engine Documentation"). It is therefore possible to develop models of Illuminators that can actually be built in the physical world and placed in the inspection apparatus according to the disclosure. For this purpose, the illuminator model (504) includes the characteristics, parametric and non-parametric, of each illuminator and, if needed, the domain of variability of the corresponding parameter.

In one embodiment provided by way of explanation of the disclosure, and not meant as a limitation thereof, these characteristics/parameters include for each illuminator (504, 604): the position with respect to the pre-defined reference system; the emission spectrum of the illuminator; the overall radiant flux emitted by the source; the directional characteristics of the radiation emitted by the illuminator; the light intensity or illuminance of the source.

Considering the importance of light in simulated environments, this represents one of the most critical issue to manage in order to create a good representation of the real system within the virtual/digital environment.

Finally, it is necessary to reproduce within the simulated environment, the model of the background and the real environment (505). Said model describes in the simulated environment 3d (SE) the real environment (RE) where the acquisition system (603), the illuminators (604) and the object to be inspected (601), with its anomalies (602), are placed and interact with each other.

In a software format that depends on the simulation engine, the model (505) includes the position and orientation of the components (501,503,504) with respect to a reference system; the shape of the cameras (503) and of the illuminators (504); any element of the real environment that can affect the image acquisition of the camera (503,603) such as the presence of reflective or absorbent surfaces (defined, for example, by reflectance or absorbance) or suspended particles in the environment which acts as scattering centers (scattering is defined by parameters known to the skilled in the art).

The models (50) present in the simulation environment (SE) are defined by an architecture (512) and by parameters (513) which describe, respectively, the configuration and the behavior within the virtual environment (SE).

Each of the parameters of the set (513) varies within a specific range of variability. For the sake of clarity, in the present specification the parameter space (PS) shall meant the set of all the values that the different parameters of the models (50) can assume within its own range of variability.

For example, in the case of the illuminators model (504), an architecture parameter (512) is the position of a certain illuminator that varies within a range of admissible positions according to the features of the real acquisition system (6) and the purpose of the inspection.

Every single parameter is considered individually within its own variability domain. However, some parameters may be fixed to a single value or not considered at all in some simulation.

From the procedural point of view, the simulation engine (5), for each fixed architecture (512), combines one or more admissible values of the parameters (513) in order to create a plurality of different scenarios (SCEN) in the virtual environment (SE).

In other words, the simulation engine (5) performs those activities that an operator normally carries out in an attempt to create and optimize the solution at the customer's premises through long and costly attempts. It is therefore clear the advantage of using a digital clone (DT) of the real acquisition apparatus (6) in order to: automatically perform the same tests that would be done with a traditional inspection system; and expand the inspection scenarios (SCEN).

In one embodiment provided by way of explanation of the disclosure, and not meant as a limitation thereof, for each of the different scenarios (SCEN) the simulation engine (5), produces three outputs (51).

The main output provided by the simulator (5) is based on the models (50) and consists of the set of images (511') associated with the different scenarios (SCEN). These images try to predict the real images (611) that would be acquired by real cameras (603) by arranging the components of the real acquisition system (6) according to an architecture (512') and an operating mode regulated by the parameterizations (513'). Clearly the set of images (511') is a subset of the set (511).

The second output provided by the simulation engine (5) is the architecture of the physical system (512') associated with each image (511'). Finally the third output is represented by the parameterizations (513') of the individual models (50) within the virtual environment (SE).

As will be explained below, these outputs are essential to drive the optimal design of the real acquisition system (6).

In one embodiment provided by way of explanation of the disclosure, and not meant as a limitation thereof, the architecture of the physical system (512') includes: with reference to cameras (503,603), types, positions in the environment (SE, RE), directions of the respective optical axes; with reference to the illuminators (504,604), types, positions in the environment (SE, RE), spectrum, emission direction; with reference to the environments (505,605), definition of backgrounds and of other elements which interact with the radiation emitted by the illuminators (504,604).

In one embodiment provided by way of explanation of the disclosure, and not meant as a limitation thereof, the parameterizations (503') of the individual models (50) of the acquisition system include: exposure time, gain, focus point of the cameras (503,603); on/off status of the illuminators (504,604), emission spectrum and the radiant flux.

Figure 4:
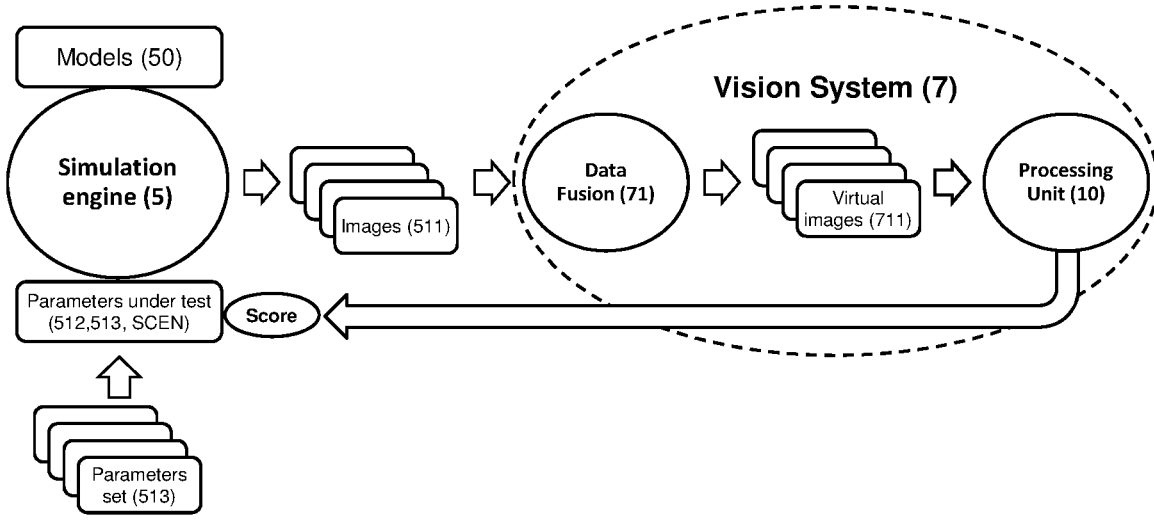
FIG. 4 schematically illustrates the structure of the vision system and the processes in which it is involved with the related input and output data.
Figure 4:
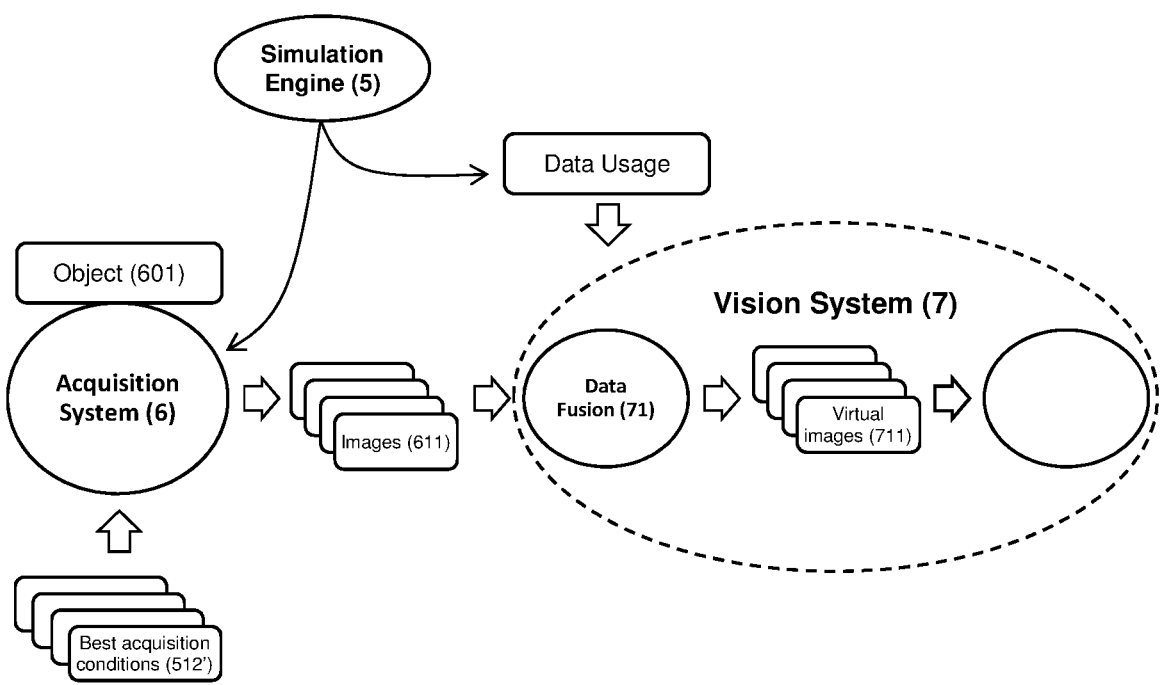

However, the parameterizations (503') can be different if in the real environment (RE), and hence in the simulated environment (SE), there are present other elements that can affect the definition of the best acquisition conditions.
The Vision System With reference to the accompanying FIGS. 1 and 4, the inspection apparatus (1) according to the disclosure includes a vision system (7) which processes the images (511,611) so as to identify the differences between the ideal object (600), i.e., the "golden sample", and the real object (601).

From the architectural point of view, in one embodiment the vision system (7) is a module of the simulation engine (5). In another embodiment the vision system (7) is a "client module" of the vision system (7). Such embodiments are provided by way of explanation of the disclosure, and are not meant as a limitation thereof.

Anyhow, the vision system (7) of the inspection apparatus (1) according to the disclosure comprises a data fusion module (71) functionally associated with a processing unit (10) which shall be described later.

The data fusion module (71) generates one or more optimal images (711) in terms of defect representation i.e., it provides those images containing only the parts of the real physical object (601) useful for subsequent interpretation.

Indeed, in any generic image, not all regions are useful to the inspection process. For the sake of clarity, in this specification "region of interest" (714) shall meant the portion of the image, virtual (511) or real (611), in which there are pixels useful for the analysis of the real physical object (601). As shown schematically in FIG. 5, each image of the object (601) can contain more than one region of interest (714).

In one embodiment provided by way of explanation of the disclosure, and not meant as a limitation thereof, a region of interest (714) can be described by a polygon with at least 3 vertices through a collection of coordinates of the image points (x, y).

Generally, only a small sub-portion of the region of interest (714) can be considered truly representative of the object (601) and the anomaly (602). This area is defined as a "useful region" of the image (715) and is preferably described by a generic polygon with at least 3 vertices.

In turn, a region of interest (714) can contain several useful image regions (715) and, conversely, a useful region (715) of an image must be contained in at least one region of interest (714). Therefore, for each image (511) there are one or more useful regions (715).

For this reason there is a map between the set of useful regions of the image (715) and the real physical object (601), and in particular each portion of the object (601) can be associated with a useful region of the image (715).

To define a useful region of the image (715), a quantitative definition of the term "representative" referred to the real physical object (601) must be provided. Once this definition is given, it is possible to obtain the best representation of the object by considering the useful regions (715) of the image in the entire stream of scanned images (511).

The data fusion module (71) is intended exactly for this task which is accomplished by performing the following operations: first, definition of the useful regions of the imagine (715) for each region of interest (714) among all the images (511') captured by the virtual camera (503) associated with the scenarios (SCEN); then, definition of the way to use all useful regions of the image (715) extracted to create a virtual representation of the object (501) optimized for each specific anomaly (502,602) to be inspected. In this way, by using all the useful regions of the image (715), the data fusion module (71) generates a set of optimal images (711) which represents the best virtual representation of the object (501,601).

By applying an interpretation model (IM) to the set (715) of the useful regions, the data fusion module (71) calculates the degree of representation of the anomaly (602) in each of the useful regions (715) for each possible set of parameters (513') associated with the scenarios (SCEN).

In one embodiment, the interpretation model (IM) assigns to each region (715) the probability P that the anomaly (602) is represented on the basis of the reference model (502) of the anomaly (602).

In another embodiment, the interpretation model (IM) assigns to each region (715) a correlation index P (where $0 \leq P \leq 100\%$) between the second 3d model (501') of the object (601) and each element of the set of images (511).

In a further embodiment, the correlation is associated with each single useful region (715) with a dimensional parameter that depends on the size of the anomaly under examination.

In a still further embodiment, the interpretative model (IM) calculates the maximum number of useful regions of the image (715) considering the entire collection of virtual images (511') created by the simulation engine (5).

Such embodiments are provided by way of explanation of the disclosure, and are not meant as a limitation thereof.

However, other models of interpretation (IM) can be used, such as the maximum extension of the useful regions of the image (715), depending on the purpose of the inspection process, the features of the object (601) and the anomalies (602) to investigate. In this way, it is possible to determine: for each image corresponding to a scenario (SCEN), the portions of the image having the maximum representation of the real physical object (601); the architectures (512") and the parameters (513") corresponding to the best acquisition conditions ($512_{best}$, $513_{best}$) or to those conditions that maximize the interpretation model (IM) and an appropriate objective function which defines the objective of the inspection process.

In one embodiment, provided by way of explanation of the disclosure, and not meant as a limitation thereof, a simple way to define the best acquisition conditions ($512_{best}$, $513_{best}$) is to maximize the area of the useful image region (715) for each parameterization (513) of the real or virtual acquisition system (5,6).

In one embodiment, provided by way of explanation of the disclosure, and not meant as a limitation thereof, a good indicator in the real analysis mode can be the "real detection rate" which can be defined as the percentage of anomalies (602) detected with respect to the real number present in the real physical object (601) including any false positives. The corresponding parameter in the design mode, is the "estimated detection rate", i.e., the percentage of anomalies estimated by the vision system (7) compared to the number present in the model (501') of the object (601).

After applying the interpretation model (IM) to the set of useful regions (715), the data fusion module (71) of the vision system (7) according to the present disclosure selects only the useful regions (715) where the level of representation of the anomalies (602) satisfies a predetermined standard e.g., defined by a predefined threshold value TP. Such value substantially defines how much the models (501,502) condition the procedure to obtain the target image (515) with the maximum representation of the anomalies (602).

In practice, in this step it is generated a set of regions of interest (714) consisting of regions having a correlation value P such that P≥TP or the correlation index P is maximum.

In an embodiment of the present disclosure, In one embodiment provided by way of explanation of the disclosure, and not meant as a limitation thereof, the data fusion module (71) generates one or more target images (711) of the object (601) obtained by "merging" the regions of interest (714). These regions are merged by bilinear interpolation or similar, in order to obtain a reduced set of images constructed with the best representations.

In a further embodiment of the present disclosure, intended solely for illustration of the disclosure and not a limitation thereof, each selected area can be simply copied pixel by pixel from the specific image on the target image (711). Since generally the lighting conditions can be different, the average gray value and the standard deviation are preferably modified by adjusting these quantities between adjacent regions. This operation can be easily obtained by calculating an average value of these parameters over a set of adjacent regions in order to make the transitions between them homogeneous.

Preferably, the value of each pixel of each region (715) is changed while copying from the source image (511') to the target image (711), according to the modification factor calculated between the neighboring regions. Other methods typical of image processing and well-known to the skilled in the art can however be used.

In addition to the target images (711), the data fusion module (71) according to the disclosure provides a second output consisting of the set of descriptions of the useful regions (715) used to assemble the images (711), for example the form of Cartesian coordinates.

Since as explained above, each image (715) is associated with an image (511') and hence with simulation parameters (513'), the images (715) also "inherit" this association. Therefore, the third output provided by the data fusion module (71) is a set of architectures ($512_{best}$) and parameters ($513_{best}$) consisting, respectively, of the elements (512') and (513') associated with the regions of interest (714) used to assemble the images (711).

As a consequence of the generation process, the target images (711) represent the anomalies (602) in the best possible conditions.

It will be apparent from the description provided that to ensure maximum image quality and representativeness of all anomalies (602), it is necessary to consider a plurality of images (511') using virtual cameras (503) in different acquisition conditions. If these images do not contain the defect (602), or even the object (601), then it is necessary to modify the architecture (512') and/or the values (513') within the set of parameters (PS). In this way, it is possible to obtain a set of images of useful regions (715) that allows a representation of the anomalies (602) on the entire surface of the object (601).

Processing Unit

With reference to the enclosed FIG. 1, intended solely for illustration of the disclosure and not a limitation thereof, the inspection apparatus (1) includes a processing unit (10). The processing unit (10) is functionally associated with: the real acquisition system (6), the simulation engine (5), the vision system (7), or a combination thereof.

The processing unit (10) performs the operations required by the various modules of the inspection apparatus (1) which have been described above. In particular, the main duties of the processing unit (10) consist in: performing simulation processes of the real inspection process; processing the images (611) acquired by the real acquisition system (6); and providing an evaluation related to the inspection of the real physical object (601) according to an objective function.

For this purpose, according to the computational needs of the various modules of the inspection apparatus (1) an appropriate computer programs (SW) is implemented in the processing unit (10).

From the architectural point of view, the processing unit (10) can be local or remote, single or distributed and therefore formed by distinct computing units (11) which can be local or remote. Combinations of distinct computing units (11), local and remote, are also possible. Preferably, the distinct computing units (11), if any, have a certain degree of integration so as to enable data exchange or data sharing.

In one embodiment, provided by way of explanation of the disclosure, and not meant as a limitation thereof, the real acquisition system (6) and the vision system (7) share the same processing unit (10) in the form of a workstation (11), while the simulation engine (5) is implemented in a separate computing unit (11) in the form of a remote server. In this embodiment, through the data fusion module (71), the vision system (7) exchanges data with the simulation engine (5). Said data may refer, for example, to virtual images (511') generated by the simulation engine (5) or to optimal virtual images (711) created from the useful regions of the image (715).

In an alternative embodiment, the real acquisition system (6) and the vision system (7) can have distinct computing units (11), while the simulation engine (5) can be installed directly on the workstation (11) of the vision system (7).

Other architectures for the processing unit (10) are however possible as needed.

In one embodiment, provided by way of explanation of the disclosure, and not meant as a limitation thereof, the computing unit (11) is functionally associated with the real acquisition system (6) and processes the acquired images in order to facilitate the subsequent processing operations required by the other modules.

The computing unit (11) is functionally associated with the simulation engine (5), and it is configured to implement a computer program (SW) that generates the digital clone (DT) of the real acquisition system (6) and implements simulations. Preferably said computer program (SW) is UnReal® (registered trademark of Epic Games Inc). However, other known software can be used as well as proprietary applications developed from well-known technology to the skilled in the art.

In one embodiment, provided by way of explanation of the disclosure, and not meant as a limitation thereof, the computing unit (11) is functionally associated with the vision system (7) and it includes an image stream processing engine. Such images can be created: by the simulation engine (5); by the vision system (7), through the data fusion module (71); or directly from the real acquisition system (6).

The computer programs (SW) operating in the processing unit (10) enables the inspection apparatus (1) according to the present disclosure to operate according to two distinct, but integrated, operating modes. Modes differ in the way processing on the image stream by the engine simulation (5) and the vision system (7) is carried out. These methods defined as "design mode" and "real analysis mode" are described below solely for illustration of the disclosure and not a limitation thereof.

Design Mode

In the design mode, the data fusion module (71) receives two inputs: the first consists of the set of images (511) created by the simulation engine (5); the second consists of information describing the way in which each image (511) of the stream was created.

Preferably, the images (511) received by the simulation engine (5) have the same format as the real images (611).

In one embodiment, provided by way of explanation of the disclosure, and not meant as a limitation thereof, the first input consists of the stream of the images (511) in which the model of the object (501) is represented and the digital representation of the anomalies (502). In said embodiment the anomalies (502) is in the form of a single defect.

In a further embodiment, provided by way of explanation of the disclosure, and not meant as a limitation thereof, the first input includes the digital representation of the anomalies (502) in the form of a covering or texture, while the second input includes the features of said texture for each image (511). These features include the arrangement of the elements forming the texture.

Advantageously, the texture provides a detailed evaluation of the quality of each small portion of the simulated object (501) represented in the images (511). Preferably, this evaluation is expressed through a quality score based on a predefined metric. In one embodiment provided by way of explanation of the disclosure, and not meant as a limitation thereof, the metric is based on the useful regions (715) of an image (511). For example, this metric is the sum of the areas of the useful regions (715) of a given image (511).

In this way the texture enables to generate, for a generic image (511) of the stream, a set of useful regions (715) and a set of regions of interest (714) associated with a quality score that expresses how much the real physical object (601) with the relative anomalies (602) is represented.

In the design mode, the output of the data fusion module (71) of the vision system (7) includes: the useful regions of the image (715); the best image acquisition conditions $(512_{best}, 513_{best})$; the optimal images (711) corresponding to the best acquisition conditions $(512_{best}, 513_{best})$; a high quality model (710) to represent the object (501,601).

The useful regions of the image (715) constitute a set of regions for each acquired virtual image (511) which are considered significant for the purpose of constructing the stream of optimal images (711).

Since each region (715) is associated with a precise architecture (512') and combination of parameters (513') for a given scenario (SCEN), the second output provided by the simulation engine (5) consists of the best acquisition conditions $(512_{best}, 513_{best})$. By configuring the real acquisition system (6) according to the best acquisition conditions $(512_{best}, 513_{best})$, the images (611) with the best representation of the real physical object (601) and any anomalies (602) can be acquired.

In one embodiment provided by way of explanation of the disclosure, and not meant as a limitation thereof, the best acquisition conditions $(512_{best}, 513_{best})$ are calculated as the parameterization corresponding to the maximum area of the useful regions of the image (715) as the parameters (513) vary in the set of scenarios (SCEN) within the parameter space (PS).

The third output consists of the set of optimal images (711) generated by means of the previously extracted regions corresponding to the best acquisition conditions $(512_{best}, 513_{best})$ and applied to the simulated virtual images (501) of the object (601).

Finally, the identification of the best regions (715) of the images and the creation of the optimal images (711), provides a "super-image" i.e., a high quality model (710) to represent the real physical object (601) in the simulation environment (SE).

This model (710) differs from the real simulated object (501) because each point of the model was acquired in the best conditions $(512_{best}, 513_{best})$ to represent the real physical object (601) and therefore using the conditions in which the cameras (503), illuminators (504) and backgrounds (505) must be positioned and configured to represent the real physical object (601) in the optimal way.

Ideally this representation does not change by varying the point of view and lighting because the general conditions of acquisition can be considered homogeneous and independent on all sections of the object.

In analogy to the operations performed by a vision system for quality control of a known type, the images (711) thus obtained can then be subsequently subjected to processing by means of algorithms in order to: find the positions of the anomalies (502,602), identify their features and classify them in homogeneous categories according to the objective of the inspection process.

However, compared to the known type of vision systems, the availability of the set of optimal images (711) obtained by fusion, constitutes a great advantage of the present disclosure. In fact, being a small set of images, the algorithms have to analyze a smaller set of data and operate only on excellent data i.e., images (711) that maximize anomalies representation and at the same time do not contain areas of the images which are not relevant for the purpose of the inspection (such areas have been removed previously).

In the image processing step (711) several analysis and classification algorithms can be used, preferably: SVM classifiers, neural networks classifiers, pattern matching algorithms, with or without scales invariance and rotations invariance, Baesyan classifiers based on multivariable Gaussians (MOG).

As mentioned previously, the output of such algorithms can be associated with the detection rate which summarizes how successful is the inspection apparatus according to the disclosure in anomaly detection (602). The association advantageously enables, for each architecture (712') and configuration (713') of the "digital twin" corresponding to the acquisition system (6), an estimate of the performance obtainable even before the construction of the apparatus. Furthermore, the association between the target images (711) and the "detection rate" enables to optimize the design of algorithms for detection, identification and classification of anomalies (602), expanding the possibility of simulation and training of the self-learning algorithms even in conditions which barely occur in real environments, or in a scenario where real images (611) are expensive or difficult to obtain.

In this way, a design tool for developing and improving vision algorithms was also disclosed. Finally, the association between the target images (711) and the detection rate enables analysis and optimization of the real acquisition system (6), not only according to the anomalies (502,602) representation in the acquired images (511', 711), but also as a function of the overall detection rate.

This feature makes possible to discharge configurations of the real acquisition system (6) with respect to the optimal design, where the anomalies (502,602) are always well-represented in the images (511',711), but where such cases are not interesting for the purposes of an "overall detection rate" calculation, e.g., because they are redundant, or because they refer to defects and/or anomalous conditions of the object that rarely occur and therefore do not justify their study in terms of time and cost.

In other words, a design system has been disclosed, which provides the design of a quality control apparatus that is optimized not only in terms of the anomalies representation in the images, but also in terms of the detection rate of such anomalies in the product to be inspected.

Real Analysis Mode

In the real analysis mode, the real acquisition system (6) replaces the simulation engine (5). This system (6) is arranged according to the results provided by the simulation engine (5) which defines not only the type, positioning and orientation of the various components of the system (6), but also their parameterizations i.e., the operating modes of the components which allow to maximize the likelihood of detecting a defect (602) in the real object (601).

In this mode, the data fusion module (71) receives two inputs: the first input is a set of images (611) of the real object (601) acquired by the real acquisition system (6)

using the best acquisition conditions ($512_{best}$, $513_{best}$) defined through the design mode; the second input is the description of the set of useful areas of the image (715) associated with each single image (511') using the best acquisition conditions ($512_{best}$, $513_{best}$). The images (511') correspond to a scenario (SCEN) defined by an architecture (512') and a combination of parameters (513'), similar to the design mode.

In the real analysis mode the output of the data fusion module (71) of the vision system (7) is a subset of the output provided in the design mode. The input includes: the stream of optimal images (711), generated using the useful regions of the image (715), applied to the real images of the object (601) acquired by the acquisition system (6); a plurality of regions (715) associated with each image acquired using the best acquisition conditions ($512_{best}$, $513_{best}$) that are considered useful for the construction of the optimal image stream by combining the real acquired images (603).

Furthermore, the optimal images (711) enables the creation of a high quality real representation of the object (601) which can be used within the simulation engine (5) to visualize in the best acquisition conditions ($512_{best}$, $513_{best}$) the real physical object (601) captured during the inspection step.

In summary, the data fusion module (71) receives an input that does not depend on the operating mode (design/real analysis). The first input is the stream of optimal images (711) created by the data fusion module (71) using all the related information described above.

The optimal images (711) represent in the best possible conditions the real physical object (601) subjected to inspection or the simulated object (501) in design mode. The second input is the set of general parameters to define the main objective of the vision system (7). Preferably it can be any vision system script which combines the block of algorithms to provide specific data output.

In the real analysis mode the output of the vision system (7) is strictly correlated to the specific objective required by the inspection. This and others features shall appear more clearly from the description of three preferred embodiments which follow.

PREFERRED EMBODIMENTS

First Embodiment

The first preferred embodiment, provided by way of explanation of the disclosure, and not meant as a limitation thereof refers to an inspection apparatus (1) for quality control of a real object (601).

In the first embodiment, the object (601) is a pair of glasses and the objective of the quality control is inspecting scratches (602) on the surfaces of the lenses.

Detecting a scratch on a transparent glass or plastic surface requires a very accurate, precise and particular lighting and shooting conditions.

In this embodiment, the real acquisition system (6) comprises a single camera (603) and a single illuminator (604). Preferably the camera (603) is fixed and is configured to obtain visible images, and consistently the illuminator (604) is composed of a plurality of individual white light LED devices placed in a fixed position. However, depending on the quality control objective and requirements, the illuminator (604) can be placed in a variable position and the illuminator (604) can be of a different type.

In this embodiment, the model (501) of the eyewear (601) is described by a 3d CAD model generated by Solid Edge®

(registered trademark of Siemens Industry Software Inc) or by SolidWorks® (registered trademark of Dassault Systèmes SolidWorks Corp) where each component is also associated with a color, a specific material (e.g., plastic, metal) and with surface treatments (e.g., polished or opacque) that can affect light reflection.

In this embodiment, the 3d CAD model (501) includes the lighting response characteristics, preferably the parameters of the local Phong model (color, texture, etc.). In addition, the reference model (502) for the plurality of scratches (602) is also a 3D model in a format compatible with the first reference model (501) of the eyewear (601). A suitable model of a scratch can be a groove described by a 3D solid that can also be generated starting from an analysis of a typical scratch obtained, for example, by using an interferometric chamber.

However, for the purpose of implementing the present disclosure, in the modeling step the structure of a typical anomaly (502) must be analyzed in detail so that the model (502) represents the real defect (602) as faithfully as possible. Furthermore, it is important that the model describing the defect is at high resolution, in order to obtain a correct identification of the anomaly when it is inspected.

Once the anomaly has been modeled, a second 3d model (501') of the object to be analyzed is generated by adding the model of the anomaly (502) to the first model of the object (501). Basically, a virtual object that has to simulate as faithfully as possible a real eyewear having lenses affected by scratches is obtained. Scratches can be localized or can be distributed over the entire surface of the lenses.

In the first preferred embodiment, provided by way of explanation of the disclosure, and not meant as a limitation thereof, the plurality of scratches (502) is arranged according to a regular "tile texture" that covers the entire surface of the eyewear lenses (501,601).

Preferably this task is performed by the simulation engine (5) in which a simulation software is implemented. The software enables to generate a virtual representation (501') of an object (601) deteriorated by an anomaly (502,602) in an extremely controlled way. In this way, it is advantageously possible to obtain a model of eyewear (501') in which each single scratch (502) has a different position, orientation, length and depth which are determined by simulation parameters (varying in suitable sets of values), that describe the characteristics of the anomaly under inspection.

In the first preferred embodiment, the simulation engine (5) generates a first set of images (511) of the second 3d model (501') of the glasses (601) by means of the virtual camera (503). As explained above, these images are created by varying the simulation parameters within sets of predefined values.

In the first embodiment, the set of parameters (513') includes an element consisting of the position of the virtual camera (503) with respect to the glasses (501). The position can assume values that define corresponding scenarios (SCEN).

Figure 5:
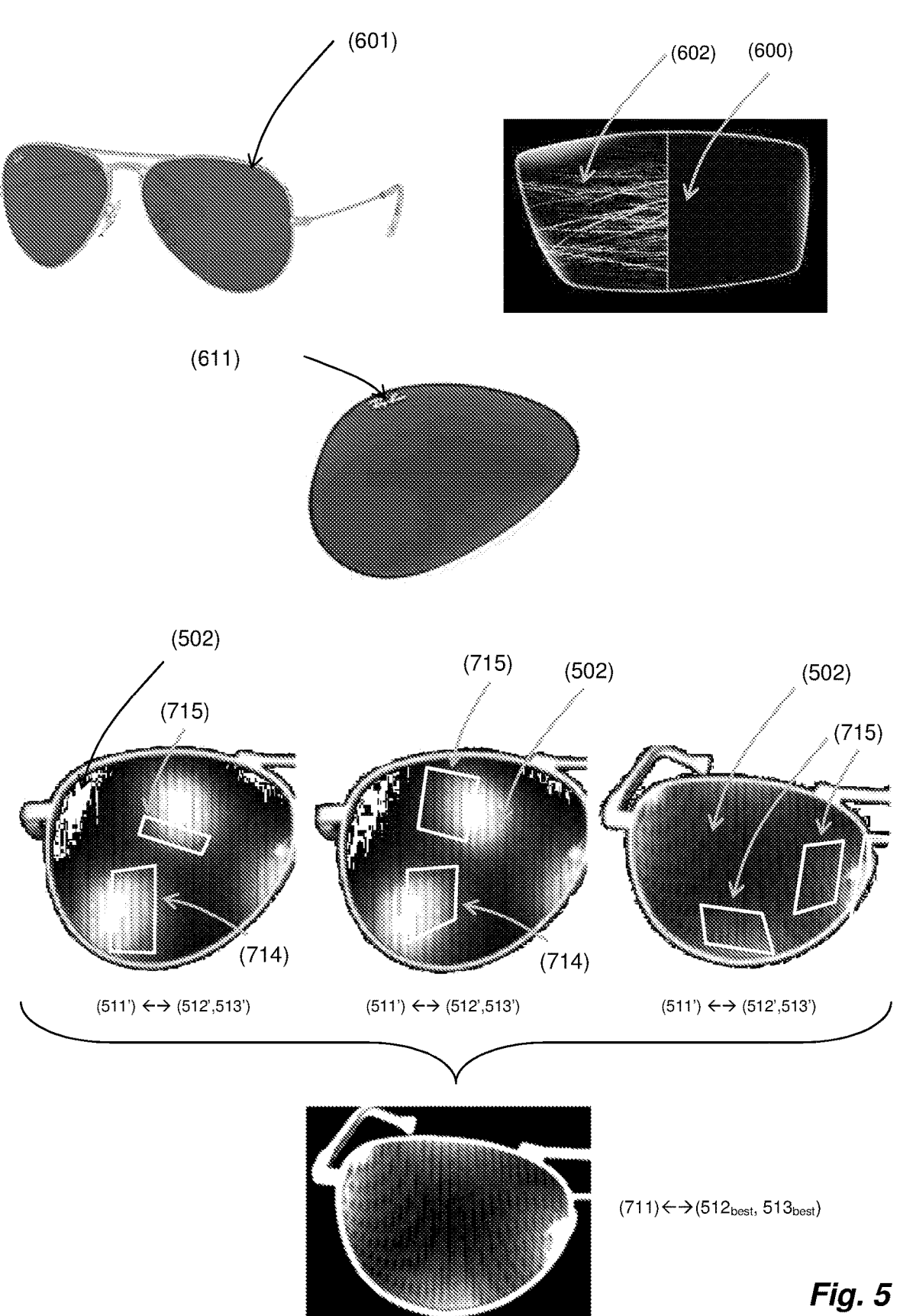
FIG. 5 illustrates the regions of interest and the useful regions with reference to the data fusion module according to a preferred embodiment.
Figure 6:
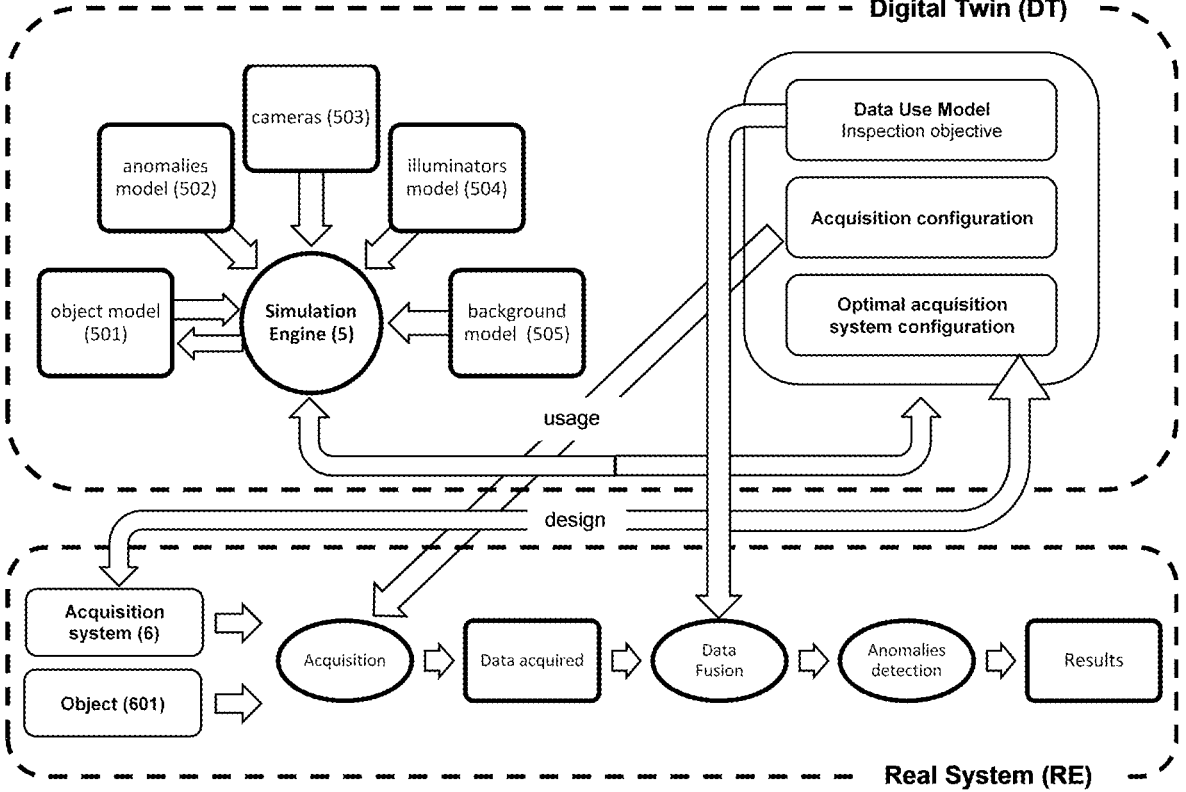
FIG. 6 represents in (a), the flow diagram of the method according to the present disclosure, while in (b) some parameters used by said method during an inspection process.

With reference to the enclosed FIG. 5, intended solely for illustration of the disclosure and not a limitation thereof, each image (511) contains both useful regions (715) of the glasses, (601) where scratches (602) are clearly visible, and regions of the glasses, where scratches are not visible (e.g., due to reflections of the lights that illuminate the glasses), as well as regions where parts of the glasses do not appear (601) at all (e.g., only the background is visible). Since the reflections appear in different areas, the three images together provide a good representation of the entire lens in terms of representation of the scratches over the entire surface.

As explained above, the degree of representation of the scratches (602) in each of the useful regions (715) is evaluated by applying an interpretation model (IM), which assigns to each region (715) the probability P that the scratches (602) are represented in the regions (715) on the basis of the reference model (502) of the scratches.

In the first preferred embodiment, provided by way of explanation of the disclosure, and not meant as a limitation thereof, the model (IM) evaluates to what extent the scratches (502) arranged by the simulation engine (5) are actually distinguishable by calculating the correlation index P (where $0 \leq P \leq 100\%$) between the second model (501') 3d of the glasses (601) and each image of the imagines (511).

Since in this embodiment the scratches (502) are arranged in a controlled manner, by correlating the number and positions of the scratches (602), to the parameters (513) and to the correlation index P, it is possible, first, to find conditions that make the scratches more easily identifiable, and then evaluate the detection rate for the system configuration corresponding to the parameters (513). In this way, a metric to measure the representation of the characteristic (602) of the object (601) has been introduced, which is an indicator of how much the scratches on the eyewear lenses are easily identifiable and detectable.

In the first embodiment of the disclosure, the inspection process concludes with the generation of a set of target images (711) of the glasses (601) in which the scratches (602) are best represented.

In the first preferred embodiment, provided by way of explanation of the disclosure, and not meant as a limitation thereof, the images (511) of the regions of interest (715) having the maximum values of statistical correlation P have been selected.

It will be apparent to those skilled in the art that the embodiment provided here is useful for designing a modular apparatus for quality control. In fact, the output of the simulation engine (5) and of the vision system (7) is the metric that provides the representation of the scratches (602) on the images (511) generated by the virtual camera (503). By optimizing the metric it is possible to find the position of the camera (603) which maximizes the representation of the scratches in the images (511).

As explained previously, this condition describes the optimal configuration ($512_{best}$, $513_{best}$) of the inspection apparatus (1) i.e., how the apparatus (1) should be made and configured to find the scratches (602) present on the lens surfaces in the most efficient way.

Advantageously, the optimal configuration is preferably expressed by means of the detection rate which summarizes the effectiveness of the quality control system before the anomaly detection apparatus is physically made.

It will be evident to those skilled in the art that the defect (602) may be different from the one described, both in type and in positioning. For example, the scratches can be randomly arranged on the surfaces of the lenses or other parts of the glasses, or the defect can be represented by a single scratch.

It will also be evident from the description herein provided that the inspection apparatus (1) can be more generally used to verify the correspondence of the finished glasses (601) with the model (501) of the same, highlighting any possible defect or anomaly (602). For example, the inspection apparatus (1) can be used to check: the presence of all the components of the glasses; the correct positioning of these components within a certain tolerance range; the symmetry of the glasses; the absence of scratches or specific surface finishes; the absence of glue outside areas where it is intended to be used.

By taking into account the extremely wide variability of glasses manufactured considering all the combinations for each component (about several thousands are built every year), the advantage of the inspection apparatus and of the new design methodology described here is evident according to the first embodiment of the disclosure. In fact, it is possible to create a sufficiently precise and flexible apparatus which can be adapted to the different conditions of inspections.

Second Embodiment

Similarly, the second preferred embodiment, provided by way of explanation of the disclosure, and not meant as a limitation thereof, is related to an inspection apparatus (1) for quality control of eyeglasses (601) having lenses whose surfaces can be affected by scratches (602). The real acquisition system (6) is the same as the previous form.

The second preferred embodiment is characterized by a further optimization step performed by the processing unit (10) associated with the data fusion module (71). Said step consists in the use of virtual images (511') for the generation of other virtual images (711) which are composed exclusively of areas classified as representative on the basis of teachings disclosed previously.

As we have explained, by means of the simulation engine (5) it is indeed possible to find the conditions (512', 513') of the acquisition system (603) that maximize the representation of the scratches in the glasses from the images obtained by the virtual cameras (503). Therefore this set of conditions represents the configuration of the system in terms of the characteristics of the illuminators, cameras, optics with relative positions, distances and any other elements that contributes to obtaining representative images.

Each image (511') obtained from virtual cameras (503) contains both portions of the eyewear where scratches can be clearly distinguished, as well as portions of glasses where scratches do not appear and more generally areas of the image where parts of the eyewear (e.g., background) are not even present.

Therefore, to ensure the maximum representation of all the scratches, a plurality of images obtained with different shooting conditions has to be considered. In other words, the set of all images allows to obtain a representation of the scratches on 100% of the eyewear surface under inspection. It has in fact been said that many images (511') are available downstream of the simulations and each is associated with a set of representation indexes, preferably a statistical correlation index P, each referring to a small area of the image (714,715).

In the second preferred embodiment, provided by way of explanation of the disclosure, and not meant as a limitation thereof, only the useful regions (715) of the images (511') having the maximum value of such indexes are selected. In this way, it is possible to merge the selected regions and obtain a reduced set of images (711) created with the best possible representations. Alternatively, images characterized by a representation index above a predefined TP threshold can be selected.

In the second preferred embodiment said regions (715) are fused by bilinear interpolation.

As the enclosed FIG. 5 schematically illustrates, the reduced set of images (711) consists of the image below which is formed by merging the regions of interest of the images (above) belonging to the set (714) and selected in the previous step.

In the second preferred embodiment, the fusion operation involves selecting the individual regions (715) of the lens (obtained by means of a fixed and predetermined arrangement of a scratch pattern), and copying these regions (715) pixel by pixel from the specific image (one of the three at the top in FIG. 5) to the final image (711). However, other methods can be used which will not be detailed here as they are widely used in the literature and are well-known to those skilled in the art.

The set of images (711) obtained from the fusion operation is therefore an optimal set of images i.e., where the representation of the anomalies is at the maximum and at the same time non-relevant image areas have been removed.

The availability of the set of images (711) constitutes a great advantage of the present disclosure as described above.

In addition, also subsequent analysis steps benefit from said reduced set of images, because they operate first on optimal data, and then on a smaller set of data.

These images (711) can then be subsequently processed individually by analysis and classification algorithms in order to find the positions and characteristics of the scratches, in analogy to the operations performed by a known type of vision system for quality control.

To conclude, thanks to the fact that the inspection apparatus (1) according to the disclosure is associated with a digital clone (DT) of the real acquisition system (6), it is possible to obtain the design of an optimized quality control machine for eyewear that allows a tremendous cost reduction as well as effectiveness maximization in identifying scratches, and more generally of other defects, on eyewear.

Third Embodiment

The third preferred embodiment, provided by way of explanation of the disclosure, and not meant as a limitation thereof, the real acquisition system (6) comprises two cameras (603) having different spectral sensitivities, for example the first in the visible and the second in the ultraviolet (UV), and two illuminators (604), for example one capable of emitting visible light and the other UV light. In this way, the real acquisition system (6) allows to obtain more detailed images (611) of the anomalies potentially affecting the real physical object (601) according to the objective of the inspection process.

In this embodiment, the second input of the data fusion module (71) in the real analysis mode, consists of the set of general parameters used to define the main objective of the vision system (7). Preferably this set is any vision system script (7) which combines the block of algorithms to provide a specific data output. In this embodiment, the script can be designed to identify a scratch on the lens of an eyeglass described by a luminous mark in some images obtained using UV dark field illumination.

It will be evident to those skilled in the art that other embodiments can be obtained on the basis of present specification and/or learnable by practice of the embodiments disclosed herein.

Conclusions

To conclude, from the description provided, it will appear evident to those skilled in the art how the design method carried out through the use of the "digital clone" and simulation techniques, allows to obtain different variables suitable for defining, not only the optimal structure of the acquisition, but also the architecture and optimal parameterization. In this way, it is possible to maximize the ability of the acquisition system to provide the best analysis objectives on the real physical object.

The modularity and flexibility of the inspection apparatus herein disclosed enables applications to different types of products and anomalies, reducing set-up and reconfiguration time as well as the related cost.

By means of the simulation engine (5) in association with the vision system (7), it is possible to obtain a rendering of the inspection system (1) and the relative bill of materials, thus greatly simplifying the installation of the inspection system at the customer's premises, saving time and money of the company's.

Finally, from the description provided it will be clear that the inspection apparatus according to the disclosure can also be used to drive any conventional vision system, regardless of the algorithms available in the vision system and the technologies used for image acquisition.

To conclude, it has been found that the embodiments described hereinabove fully achieve the intended aim and objects.

It is understood that the disclosure is not limited to the exemplary embodiments shown and described herein and although the description and examples provided contain many details, these should not be construed as limiting the scope of the disclosure but simply as illustrative illustrations of some embodiments of the present disclosure.

Hence, any modification of the present embodiments which falls within the scope of the following claims is considered to be part of the present disclosure.

Where the characteristics and techniques mentioned in any claim are followed by reference signs, these reference marks have been applied solely for the purpose of increasing the intelligibility of the claims and consequently these reference marks have no limiting effect on the interpretation of each element identified by way of example from these reference signs.

What is claimed is:

1. An object inspection apparatus comprising:
a real acquisition system for acquiring real images of a real physical object potentially affected by real anomalies compared to an ideal physical object, said real acquisition system comprising:
one or more illuminators for generating and directing radiation towards a real physical object potentially affected by anomalies or defects;
one or more cameras for acquiring real images of said object by means of said radiation,
said real acquisition system operating in a real environment (RE) wherein background elements interacting with said radiation are present, said elements conditioning the acquisition process of said real images, said real acquisition system further comprising:
a processing unit, local or remote, functionally associated with said real acquisition system, or with a vision system, said processing unit operating at least a computer program (SW) capable of processing images and providing an evaluation on the inspection of said real physical object based on an objective function,
said inspection apparatus wherein, it is associated with a digital clone (DT) of said real acquisition system, said digital clone (DT) being generated by a simulation engine, said digital clone (DT) comprising the following models:

an object digital model virtual clone of said ideal physical object or of said real physical object;
a defect digital model virtual clone of said real anomalies;
one or more simulated cameras virtual clones of said one or more cameras;
one or more simulated illuminators virtual clones of said one or more illuminators;
a digital model of background elements virtual clone of said background elements present in the real environment (RE),
said models being defined by an architecture and by parameters which describe their configuration and behavior in the virtual environment (SE), said simulation engine capable of implementing one or more simulation processes of the real inspection process by varying at least one architecture or a parameter in order to define two or more scenarios (SCEN), said simulation processes such as to provide an output comprising:
a set of virtual images of said real physical object for each of said scenarios (SCEN);
the architecture of said real acquisition system that maximizes said objective function in said scenarios (SCEN);
the parameterizations of said real acquisition system that maximize said objective function in said scenarios (SCEN).

2. Inspection apparatus according to claim 1 wherein said processing unit includes a simulation engine capable of generating the digital clone (DT) of said real acquisition system in a simulated environment (SE) dual of the real environment (RE).

3. Inspection apparatus according to claim 1 wherein:
said vision system is a client of a server where said simulation engine is implemented; or
said simulation engine is a client of a server where said vision system is implemented.

4. Inspection apparatus according to claim 1, wherein said processing unit is local or remote, single or distributed and therefore formed by distinct, local or remote, computing units or by a combination of distinct local and remote computing units.

5. Inspection apparatus according to claim 1 wherein in said processing unit is operated at least one computer program (SW) for processing images of the object, said images selected from: real images, virtual images, virtual images including anomalies, target images, or a combination thereof.

6. Inspection apparatus according to claim 1 wherein said objective function defines the maximum acceptable presence of said real anomalies, or the representativeness of said ideal physical object or of said real anomalies in said real images or in said virtual images.

7. Inspection apparatus according to claim 1 wherein:
said architecture includes: types, positions in the environment (SE,RE) and directions of the optical axes of cameras; types, positions in the environment (SE,RE), spectrum and direction of emission of illuminators; reflectance of the background elements;
said parameterizations include: exposure time, gain and focus point of the cameras; the On/Off status, the emission spectrum and the radiant flux of the illuminators.

8. A method of inspection of a real physical object potentially affected by real anomalies, said method comprising the following steps:

a) defining an interpretation model (IM) for evaluating the representativeness of said real physical object or of said real anomalies in the real images or in the virtual images;

b) obtaining a real acquisition system comprising the following components:

one or more illuminators for generating and directing radiation towards a real physical object potentially affected by anomalies or defects;

one or more cameras for acquiring real images of said object by means of said radiation;

one or more background elements interacting with said radiation and conditioning the acquisition process of said real images;

a processing unit operating a computer program (SW) for processing the acquired images, c) obtaining a simulation engine capable of generating a digital clone (DT) of said real acquisition system in a simulated environment (SE) dual of the real environment (RE), said digital clone (DT) comprising input models which include:

an object digital model virtual clone of said ideal physical object or of said real physical object;

a defect digital model virtual clone of said real anomalies or real defects;

one or more simulated cameras virtual clones of said one or more cameras;

one or more simulated illuminators virtual clones of said one or more illuminators;

a digital model of background elements virtual clone of said background elements present in the real environment (RE), said models being defined by an architecture and by parameters describing their configuration and behavior in the virtual environment (SE);

d) applying the digital model of the defect to said digital model of object, in order to obtain a model of the object which contains information on said anomalies;

e) implementing on said simulation engine one or more simulation processes of the real inspection process by varying at least one architecture or a parameter so as to define two or more scenarios (SCEN), said simulation processes such as to provide, for each of said scenarios (SCEN), an output comprising:

a set of virtual images of said real physical object for each of said scenarios (SCEN);

one or more architectures of said real acquisition system corresponding to said scenarios (SCEN);

one or more parameterizations of said real acquisition system corresponding to said scenarios (SCEN);

f) applying an interpretation model (IM) to said set of virtual images so as to associate to each virtual image, architecture and parameterization corresponding to the scenarios (SCEN) defined in step e) the probability P that the anomaly is represented on the basis of said anomaly model;

g) selecting one or more virtual images, one or more architectures and one or more parameterizations such that said probability P satisfies the relation P≥TP according to the previous step f), in order to obtain an optimal set of architectures and an optimal set of parametrizations;

h) choosing, arranging and configuring the components of the real acquisition system according to said architectures and said parameterizations in order to obtain an acquisition system that maximizes the probability of identifying said real anomaly in said real physical object;

i) by means of the optimized real acquisition system defined in step h), obtaining a set of real images of said object in the real acquisition conditions corresponding to said architectures and to said parameterizations.

9. Method according to claim 8 which further comprises the following steps:

j) obtaining a set of digital images containing virtual images or real images of a virtual object or of a real object potentially affected by virtual anomalies or real anomalies, said digital images being associated with an architecture and with parameters which define a set of scenarios (SCEN);

k) applying an interpretation model (IM) to said set of digital images in order to define a set of useful regions, said set having elements that satisfy the relation P≥TP, where P is the probability that said virtual anomalies or real anomalies are represented in said regions;

l) associating to each of said useful regions one or more architectures and one or more parameterizations corresponding to said scenarios (SCEN) defined in step j);

m) by means of a data fusion module generating one or more target images by merging said useful regions in order to obtain a set of optimal target images which constitute the best virtual representation of the object;

n) subjecting said optimal images to a processing process in order to detect and classify said anomalies and assign to each of said images or regions a score related to the representativeness of a specific anomaly.

10. Method according to claim 9 wherein said virtual anomalies are in the form of a texture having pre-defined features, said texture being applied to said virtual object, said texture being useful to provide:

an a priori evaluation of the representativeness of an anomaly on the basis of a pre-defined metric for each of said useful regions corresponding to said scenarios (SCEN); or an a priori evaluation of the detection rate of said anomaly by comparing said useful regions and said texture for each of said useful regions corresponding to said scenarios (SCEN); or an a priori evaluation of the detection rate of said anomaly by comparing said digital images and said texture for each of said digital images corresponding to said scenarios (SCEN).

11. Method according to claim 8 wherein:

said metric is a function of said useful regions, preferably the sum or the total number of the areas of the useful regions of a given image; or said useful regions are fused by bilinear interpolation; or said probability P is evaluated through statistical correlation between the model of anomalies and real images or virtual images; or said probability P is evaluated through statistical correlation between the model of the texture and the real images or virtual images.

12. A non-transitory computer-readable medium storing instructions which, when executed by a computer, cause the computer to carry out the method according to claim 8.

13. An object inspection apparatus implementing the method according to claim 8.

* * * * *